United States Patent [19]

Steinmetz et al.

[11] Patent Number: 4,687,826

[45] Date of Patent: Aug. 18, 1987

[54] MODIFIED PROTEIN ADHESIVE BINDER AND PROCESS FOR PRODUCING

[75] Inventors: Alan L. Steinmetz, Keego Harbor, Mich.; Thomas L. Krinski, Granite City, Ill.

[73] Assignee: Ralston Purina Company, St. Louis, Mo.

[21] Appl. No.: 926,709

[22] Filed: Oct. 31, 1986

[51] Int. Cl.<sup>4</sup> .......................... C08J 7/16; C08L 89/00; C09J 3/18

[52] U.S. Cl. .................................... 527/201; 106/124; 106/154.1; 106/308 P; 530/370; 530/377; 530/378; 527/202

[58] Field of Search ............... 527/201, 202; 106/124, 106/308 P, 154.1; 530/377, 378, 370

[56] References Cited

U.S. PATENT DOCUMENTS

| | | |
|---|---|---|
| 2,862,918 | 12/1958 | Meyer et al. ................. 530/378 X |
| 2,932,589 | 4/1960 | Meyer et al. ................. 530/378 X |
| 3,589,856 | 6/1971 | Wolfram ...................... 527/201 X |
| 3,685,998 | 8/1972 | Miller .......................... 527/201 X |
| 3,804,653 | 4/1974 | Morris et al. .................... 106/124 |
| 4,045,239 | 8/1977 | Hammer et al. ............. 527/201 X |
| 4,474,694 | 10/1984 | Coco et al. ................... 530/378 X |
| 4,554,337 | 11/1985 | Krinski et al. ................... 527/201 |

*Primary Examiner*—Howard E. Schain
*Attorney, Agent, or Firm*—Virgil B. Hill

[57] ABSTRACT

A modified vegetable protein adhesive binder and a process for producing the same is disclosed wherein an alkaline protein dispersion is treated with hydroxy alkyl acrylate in an amount sufficient to modify the protein material. The modified vegetable protein adhesive binder provides greater binder strength when employed in paper coating compositions containing pigment and other materials such as latex. The modified binder also results in coatings with an improved degree of water retention.

44 Claims, No Drawings

MODIFIED PROTEIN ADHESIVE BINDER AND PROCESS FOR PRODUCING

BACKGROUND OF THE INVENTION

This invention relates to a modified vegetable protein adhesive binder and a process for producing the same.

Vegetable protein materials are well known as adhesive binders for pigment containing coatings which are used for the coating of paper. Pigment containing coatings provide the paper with a desirable finish, gloss, and smoothness. The functions of the pigment is the coating are to fill in the irregularities of the paper surface and to produce an even and uniformly absorbent surface for printing. The adhesive binder functions to bind the pigment particles to each other as well as to the surface of the coating. The selection of a suitable adhesive is therefore an important factor in the quality of a coating applied to paper.

Vegetable protein materials have been extensively used as adhesive binders for paper coatings, and among those materials have been the vegetable protein isolates, typically soy isolate. Isolated soy protein is produced by the treatment of oil free soy bean flakes with an alkaline solution to dissolve the protein which is removed from the non soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for use in the preparation of pigment containing paper coating compositions. The unhydrolyzed or unmodified soy protein isolates are generally less desirable as adhesive binders for paper coatings because of relatively low solubility in weak alkaline solutions, high solution viscosity and sensitivity to heat, besides a tendency to form gels at temperatures of about 160° F. Because of these disadvantages, unmodified or nonhydrolyzed soy protein is usually modified in some way to lower the viscosity of coating compositions containing these materials as binders and furthermore to increase the adhesive strength of the protein when it is dispersed in weak alkaline solutions. Modification or hydrolysis of the protein also reduces the sensitivity of the protein to heat. Modification of the protein usually consists of hydrolysis or treatment of the extracted protein in an aqueous dispersion with various alkaline reagents under controlled conditions of pH, temperature and time, native or unmodified. These conditions disassociate the protein structure into smaller sub-units thereby improving the solubility of this material as a binder in paper coatings.

Another means of modifying the protein is to treat the unmodified protein with various chemical reagents in order to alter the rheological properties of coatings containing the modified protein material as a binder. Generally, the purpose of modifying the protein is to provide for increased fluidity of the protein material in alkaline dispersions and also much lower viscosity of coating compositions prepared with the modified protein material as a binder.

U.S. Pat. No. 2,862,918 describes such a modified protein wherein an isolated soy protein which has been hydrolyzed beyond the gel stage is acylated by treatment of the hydrolyzed soy protein material with a carboxylic acid anhydride, such as acetic anhydride. U.S. Pat. No. 2,932,589 describes a paper coating composition and process in which a modified soy protein material is produced by reaction of an isolate with a dicarboxylic acid anhydride, such as phthalic anhydride.

U.S. Pat. No. 4,474,694 also describes a modified vegetable protein adhesive binder and a process for producing the same in which an alkaline dispersion of a vegetable protein material is reacted initially with a reducing agent, followed by reaction with a carboxylic acid anyhydride to modify the protein material and provide a coating with improved strength and ink receptivity.

In spite of the various improvements that have been obtained by chemical modification of vegetable protein material and the use of these materials in the preparation of paper coating compositions, it would still be desirable to obtain a modified protein material having improved rheological properties. This objective has been generally achieved in the present invention by the production of a modified vegetable protein material which is suitable as an adhesive binder in paper coating compositions containing pigments.

It is therefore an object of the present invention to provide a modified proteinaceous adhesive binder of good rheological properties.

It is a further object to provide a modified vegetable protein adhesive binder having good pigment binding and paper coating characteristics.

SUMMARY OF THE INVENTION

These and other objects are achieved in the present invention by the production of a modifed vegetable protein adhesive binder having good rheological and paper coating characteristics. The present invention provides a process for the production of a modified vegetable protein adhesive binder which is suitable for use in pigment coating composites wherein the process of producing the modified binder comprises forming an alkaline dispersion of a vegetable protein material followed by reaction of the dispersion with a hydroxyl alkyl acrylate in an amount sufficient to modify the protein material.

Preferably, the alkyl group on the acrylate reactant is $C_1$ to $C_8$ and most preferably either $C_2$ or $C_3$. Modification of the protein material with the acrylate reactant occurs through modification of the various primary amine or sulfhydryl groups which are present in the amino acid residues of the vegetable protein material.

The vegetable protein material modified with the hydroxy alkyl acrylate provides an adhesive binder in paper coating compositions in which a significant improvement is achieved in coating strength. The coating composition with the modified binder also has an improved degree of water retention. The use of the hydroxyl alkyl acrylate for modification of the vegetable protein material pursuant to the present invention provides a unique modified vegetable protein material having improved characteristics in pigment containing paper coating compositions prepared therewith.

DESCRIPTION OF THE PREFERRED EMBODIMENTS

The present invention applied to a modified protein material suitable as an adhesive binder in paper coating compositions. More specifically the present invention pertains to a vegetable protein material, such as a vegetable protein isolate and most preferably to a soy isolate.

A soy isolate is the most commonly produced protein isolate derived from vegetable plant sources. The present invention is therefore described with respect to a soy isolate since this is the primary area of concern for which the present invention was developed, although it is apparent that other vegetable protein materials can be employed and modified in a similar manner if desired. For purposes of explanation in the context of the present invention, an isolated soy protein material is initially prepared by treatment of defatted soy bean flakes with an alkaline solution to solubilize the protein. The protein extract is then separated from the alkali insoluble solids by filtration or centrifugation. This protein extract or dispersion is typically used as the starting material in the process of the present invention. The extract or dispersion of the globular protein from the soy flakes will typically have a pH between 9.5 and 11.2. Using the protein extract from the isolate process is a preferred way of using an isolate in the preparation of the modified soy protein material of the present invention, since the extract itself has the protein already contained in an alkaline aqueous dispersion. However, it is equally apparent that a dried protein isolate which has been previously isolated from the soy flakes and dried may be used as the starting material wherein an alkaline dispersion of the dried protein material is formed for purposes of carrying out the chemical modification of the protein material pursuant to the present invention. Furthermore, the particular type of alkaline material that may be used to disperse the protein material or provide the alkaline extract of the soy bean flakes is not critical to the practice of the present invention, and in fact, any type of alkali or alkaline earth hydroxide or salts thereof, may be readily and conveniently employed in preparation of the protein dispersion.

The alkaline dispersion of vegetable protein material may then be maintained in a substantially unhydrolyzed condition or may be hydrolyzed if desired prior to reaction with the hydroxy alkyl acrylate. Maintenance of the protein in a substantially unhydrolyzed condition refers to the absence of any significant reduction in the individual sub unit molecular weight of the protein material. On the other hand, hydrolysis is achieved by the degree of reduction in these molecular sub units and is typically accomplished by heating at an alkaline pH usually 10 to 12.5, at a temperature of at least 50° C. for a minimum of 30 minutes. The particular degree of hydrolysis is not critical to the present invention and protein materials in either a hydrolyzed or unhydrolyzed condition may be employed in the present invention.

Typically, an alkaline dispersion of the vegetable protein material is in a hydrolyzed or unhydrolyzed condition, formed to provide a dispersion having a proteinaceous solids level of at least about 2% by weight, typically 2 to 20% by weight. A most preferred level of proteinaceous solids in the dispersion is about 10% by weight. Furthermore, it is preferred that the dispersion have a pH of about 8 to 12, and preferably about 9 to 11. A most preferred pH for the alkaline dispersion for purposes of chemical modification of the protein is a pH of about 10.

The dispersion of protein material is then reacted with an hydroxyl alkyl acrylate in an amount sufficient to modify the protein material. The preferred reaction conditions for purposes of modifying the protein material include a temperature of about 20° to 60° C., and preferably 40° to 50° C., as well as a maintenance of a pH of about 9 to 10 during modification of the protein. The exact temperature and time of reaction or modification of the protein is not critical to the present invention, and because of the general relationship between time and temperature, relatively longer times of reaction would be required when low temperatures are employed, whereas relatively short reaction times would be required when somewhat higher temperatures are employed. The temperature for reaction or modification of the protein is limited only by the fact that if too high a temperature is employed it may adversely affect the coating characteristics of the protein material, and it is preferred that temperature of reaction not exceed 70° C., most preferably by maintained below 60° C. A typical amount of hydroxyl alkyl acrylate is about 2 to 15% by weight of the protein solids, and preferably about 5 to 10% by weight of the protein solids.

Although the exact hydroxy alkyl acrylate employed in modification of the protein pursuant to the present invention is not critical to its practice; nevertheless, it is preferred for purposes of the present invention that a hydroxy alkyl acrylate be employed in which the alkyl group is $C_1$ to $C_8$ and most preferably $C_2$ or $C_3$. The modified protein materials produced with these reagents provide a modified protein having a degree of cross linking which significantly improves the strength of paper coating compositions employed with these modified materials as binders.

Following modification of the protein material with the hydroxy alkyl acrylate, the modified protein material can be isolated by acid precipitation at the isoelectric point of the protein which is typically at a pH of about 4 to 5, and otherwise recovered by washing, filtering, pressing, or dewatering and drying of the product. Alternatively, the modified protein material can be spray dried in the form of the alkaline dispersion without isoelectric precipitation if desired to provide a dried modified protein material also suitable for use in the preparation of pigment containing coating compositions.

Although the present invention has not intended to be limited by the exact types of coating compositions in which the modified protein adhesive binder of the present invention may be employed; nevertheless, typical coating compositions which employ the modified protein adhesive binder of the present invention generally include ingredients such as pigments, fluidizers or thinning agents, as well as various other ingredients such as optical brighteners and co-binders such as acrylic or styrene-butadiene latexes. Typically the modified vegetable protein adhesive binder of the present invention is dispersed in a solubilizing agent such as an alkaline material, typically sodium carbonate, ammonium hydroxide, sodium hydroxide and the like. These materials provide a conventional means of solubilizing various types of protein materials for use as adhesive binders in paper coating compositions. The exact amount of protein isolate used to prepare the binder solution is at a level sufficient to form an adhesive binder for the pigment coating and typically of a sufficient level so when the coating composition with the mineral pigment is prepared about 1 to 20% by weight of the coating comprises binder.

It may be desirable to further employ fluidizers or thinning agents in the preparation of the protein binder solution. This will improve the ultimate viscosity of coating compositions which are prepared with the protein binder solution. Typical fluidizers include materials such as dicyandiamide, ammonium nitrate, or urea. These agents may be employed in the preparation of the binder solution of the present invention and are added in amounts of between about 5 to 20%, preferably 5 to 10% by weight of the protein used to prepare the binder.

Following the formation of the protein binder solution, it is mixed with a mineral pigment in an amount sufficient to provide a slurry typically having a solids content of at least about 36% by weight, and typically between about 38 and 58% by weight of such slurry. The exact amount of pigment which may be employed in the present invention is not critical since a variety of levels may be suitable depending upon the exact coating characteristics desired. It is, therefore, typical to employ the pigment in an amount sufficient to provide a uniform coating on the substrate; the exact amount is not critical to the practice of the present invention. Furthermore, the exact type of pigment which may be employed is not critical and a variety of mineral pigments commonly used in the preparation of paper coatings, such as clay, calcium carbonate, titanium dioxide, and the like, are suitable.

Following dispersion of the mineral pigment with the proteinaceous adhesive binder solution, various other ingredients are added; such materials typically include co-binders such as the various latexes, preferably acrylic or styrene-butadiene latexes, which further improve the coating characteristics of the composition. The exact components of the coating composition with which the modified binder of the present invention may be employed is not critical to its practice since these represent a variety of materials all of which are well known to those skilled in the art.

The following examples represent specific but non-limiting embodiments of the present invention.

EXAMPLE 1

200 pounds of solvent extracted soybean flakes were extracted with 2,000 pounds of water at 90° F. to which was added 2.5% by weight of the flakes of calcium hydroxide. The soybean flakes were extracted for 30 minutes with the alkaline solution in order to solubilize the protein and the alkaline insoluble solids were then removed by centrifugation. The alkaline insoluble solids or extracted flakes were then re-extracted with an additional 1,000 pounds of water which had been preheated to a temperature of 90° F. in order to solubilize additional protein in the extracted flakes. Following extraction, the insoluble solids or extracted flakes were again removed from the extract by centrifugation.

The alkaline extract was hydrolyzed by adding sodium hydroxide at a level of 8% by weight of the protein and heating to a temperature of 60° C. Hydrolysis was carried out for 90 minutes at the noted temperature to result in substantially complete hydrolysis of the protein.

The hydrolyzed protein extract was then cooled to 50° C. and the pH adjusted to 4.5 by the addition of sulfuric acid in order to precipitate the protein. The precipitated protein was concentrated by centrifugation, washed twice with water and dried. An aqueous dispersion of the dried soy protein isolate was formed at a proteinaceous solids level of 10% by weight. The pH of the dispersion was adjusted to 10 by the addition of a 50% solution of sodium hydroxide. The temperature of the dispersion was heated to 50° C., followed by the addition of 10% by weight of the protein solids of hydroxy ethyl acrylate. The dispersion was maintained at 50° C. and stirred for a period of one hour. Following modification of the soy protein, the pH of the dispersion was adjusted to the isoelectric point, about 4.3, by the addition of sulfuric acid in order to precipitate the protein. The precipitated protein was then concentrated by centrifugation, washed twice with water and air dried.

EXAMPLE 2

An aqueous dispersion of the hydrolyzed soy protein isolate obtained in Example 1 was modified as described in Example 1 except that 10% by weight of the solids of hydroxy propyl acrylate was used as the reactant.

EXAMPLE 3

A control sample was prepared in which the dried isolate of Example 1 was heated at 50° C. and stirred for a period of one hour without modification by a chemical reactant. The pH was adjusted as described in Example 1, and the protein precipitated and dried.

EXAMPLE 4

The modified protein binders provided in Examples 1 and 2 were evaluated as adhesive binders in a pigment containing paper coating composition and compared to the nonmodified soy isolate that is produced as described in Example 3, which was also used as a binder in a similar coating composition.

Alkaline dispersions of the modified proteins of Examples 1 and 2 and the unmodified protein of Example 3 were prepared by dispersing the proteins at a solids level of 13.5% by weight in a 0.3 molar ammonium hydroxide solution.

Three separate paper coating compositions were prepared having a total solids level of 47.4% by weight in which the coating contained 100 parts by weight (dry basis) of clay, 0.2 parts (dry basis) of tetra sodium pyrophosphate, 10 parts by weight (dry basis) of a styrene-butadiene latex and 5 parts by weight (dry basis) of either the modified protein isolates of Examples 1 and 2 or the unmodified protein isolate of Example 3 as the binders. An identical coating was also prepared in which the dried hydrolyzed isolate of Example 1 was substituted as the binder.

The rheological properties of the coatings were evaluated as listed in Table 1. The coating compositions containing the different binders were then applied to paper with a draw down bar. The coated paper was evaluated for gloss, IGT value, and ink receptivity. The IGT value measures the force the coating will withstand with certain types of ink used in printing. The ink receptivity is measured by the percentage surface brightness drop when K&N ink is applied for a short time and removed. The smaller the number for ink receptivity, the more nonporous the coating is and therefore a lesser degree of ink penetration into the coating. These various methods for evaluating the coating are standard methods of measurement published by the Technical Association of Pulp and Paper Industries (TAPPI). The results of the testing are set forth in Table 2.

TABLE 1

Coating Viscosity (CPS) of Coating Formulations at 25° C.

| RVT VISCOSITY | MODIFIED ISOLATE Example 1 | MODIFIED ISOLATE Example 2 | UNMODIFIED ISOLATE CONTROL Example 3 | UNMODIFIED ISOLATE Example 4 |
|---|---|---|---|---|
| 10 RPM | 740 | 660 | 2640 | 2450 |
| 20 RPM | 490 | 440 | 1550 | 1475 |
| 50 RPM | 292 | 268 | 790 | 750 |
| 100 RPM | 222 | 208 | 475 | 455 |
| S. D. Warren Water Retention SEC. | 30.1 | 28.3 | 10.3 | 12.9 |

TABLE 2

Evaluation of Coating Formulations

|  | MODIFIED ISOLATE Example 1 | MODIFIED ISOLATE Example 2 | UNMODIFIED ISOLATE Example 3 | UNMODIFIED ISOLATE Example 4 |
|---|---|---|---|---|
| Coatweight (gm/m$^2$) | 15.7 | 15.7 | 15.7 | 15.4 |
| 75° Gloss (%) | 77.0 | 76.8 | 77.0 | 76.0 |
| Opacity (%) | 93.9 | 93.9 | 94.1 | 94.1 |
| Brightness | 77.2 | 77.1 | 77.2 | 77.4 |
| K&N Ink Receptivity (% drop) | 15.6 | 15.5 | 19.6 | 19.2 |
| IGT Coating Lift Off (cm/sec) | 270/136* | 220/132* | 187* | 183* |
| Ink Speed/Pressure | 5/6 M/50 | 5/6 M/50 | 5 M/50 | 5 M/50 |
| Wet Rub % T | 81.4 | 71.4 | 87.2 | 85.7 |

*Fiber tear

The above data indicate that the coatings containing the modified protein material as a binder had greater strength as is illustrated by the coating lift off values. The coatings with the modified isolates had slightly less ink receptivity with similar optical properties to that of the control. The water retention properties of the coatings with the modified isolates were considerably greater than those with the unmodified isolates.

EXAMPLE 5

An alkaline protein extract was prepared by extracting 600 grams of defatted soybean flakes for 30 minutes with 6000 ml of water reheated to 90° F., to which was added 2.5% by weight calcium hydroxide. The extraction was repeated on the flakes with 3000 ml of water at 90° F. after removal of the first extract by centrifugation. The alkaline protein extracts are combined and 8% by weight of a 50% solution of sodium hydroxide is added to adjust the pH to about 12. The protein extracts are heated at 60° C., for 90 minutes in order to substantially hydrolyze the protein.

The hydrolyzed protein extract was cooled to 50° C. and the pH adjusted to 10. The hydrolyzed extract is split into two portions and one portion is reacted with 10% by weight of the protein solids of hydroxy ethyl acrylate. The second portion is reacted with 10% by weight of the protein solids of hydroxy propyl acrylate. The reaction mixtures were maintained at 50° C. and stirred for a period of one hour.

Following reaction, the pH of the dispersion was adjusted to 4.3 with sulfuric acid in order to precipitate the protein. The precipitated modified protein is then concentrated by centrifugation, washed twice with water and then air dried.

Alkaline dispersions of the above two modified proteins, as well as a dispersion of a dried, unmodified, hydrolyzed soy isolate were prepared by dispersing the proteins at a solids level of 13.5% by weight in a 0.3 molar ammonium hydroxide solution. Three separate paper coating compositions were prepared having a total solids level of 47.4% by weight in which each coating contained 100 parts by weight (dry basis) of clay, 0.3 parts (dry basis) of tetrasodium pyrophosphate, 10 parts by weight (dry basis) of a styrene-butadiene latex, and 5 parts by weight (dry basis) of either the modified proteins produced as described above or the unmodified hydrolyzed protein as the adhesive binders for the coatings. The coatings were evaluated for rheological properties as listed in Table 3. The coatings were evaluated for coating characteristics as described in Example 4, with the results set forth in Table 4.

TABLE 3

Coating Viscosity (CPS) of the Coating Formulations at 25° C.

| RVT VISCOSITY | MODIFIED ISOLATE Hydroxy ethyl acrylate | MODIFIED ISOLATE Hydroxy propyl acrylate | UN-MODIFIED ISOLATE |
|---|---|---|---|
| 10 RPM | 480 | 540 | 3950 |
| 20 RPM | 310 | 360 | 2200 |
| 50 RPM | 192 | 228 | 1030 |
| 100 RPM | 164 | 196 | 590 |
| S. D. Warren Water Retention SEC. | 37.4 | 30.8 | 13.1 |

TABLE 4

Evaluation of Coating Formulations

|  | MODIFIED ISOLATE Hydroxy ethyl acrylate | MODIFIED ISOLATE Hydroxy propyl acrylate | UN- MODIFIED ISOLATE |
|---|---|---|---|
| Coatweight (gm/m$^2$) | 15.0 | 15.1 | 15.1 |
| 75° Gloss (%) | 80.2 | 80.5 | 78.7 |
| Opacity (%) | 93.1 | 93.1 | 93.1 |
| Brightness | 77.0 | 76.9 | 77.2 |
| K&N Ink Receptivity (% drop) | 17.1 | 14.6 | 18.3 |
| IGT Coating Lift Off (cm/sec.) | 213 | 208 | 174* |
| Ink Speed/Pressure | 6 M/50 | 6 M/50 | 6 M/50 |
| Wet Rub Resistance (% T) | 80.3 | 72.2 | 84.4 |

*Fiber tear

An examination of the above results reveals that the water retention properties of the coatings containing the modified protein as binders had improved to a considerable degree over the unmodified protein material. The coatings with the modified protein also were much stronger and had good optional properties.

While the present invention has been described with regard to the specific embodiments set forth above, it should be understood that it is intended to include within the scope of the present invention all equivalents thereto.

What is claimed is:

1. A process for the production of a modified vegetable protein adhesive binder comprising:
   (a) forming an alkaline dispersion of a vegetable protein material;
   (b) treating said dispersion with a hydroxy alkyl acrylate in an amount sufficient to modify the protein material.
2. The process of claim 1 wherein said vegetable protein material is a vegetable protein isolate.
3. The process of claim 1 wherein said dispersion has a proteinaceous solids level of at least about 2% by weight.
4. The process of claim 3 wherein said dispersion has a proteinaceous solids level of 2 to 20% by weight.
5. The process of claim 4 wherein said dispersion has a proteins solids level of about 3 to 12% by weight.
6. The process of claim 1 wherein said dispersion has a pH of about 8 to 12.
7. The process of claim 6 wherein said dispersion has a pH of about 9 to 11.
8. The process of claim 7 wherein said dispersion has a pH of about 10.
9. The process of claim 1 wherein said dispersion has a temperature of about 20° to 60° C.
10. The process of claim 1 wherein the amount of hydroxy alkyl acrylate is about 2 to 15% by weight of the protein solids.
11. The process of claim 10 wherein the amount of hydroxy alkyl acrylate is about 5 to 10 by weight of the protein solids.
12. The process of claim 1 wherein the alkyl group is C$_1$ to C$_8$.
13. The process of claim 1 wherein the vegetable protein material is a soy protein isolate.
14. The process of claim 1 including the step of adjusting the pH of the treated dispersion to the isoelectric point to precipitate the modified protein material.
15. The process of claim 1 including the step of dewatering the modified protein material.
16. A process for the production of modified vegetable protein adhesive binder comprising:
    (a) forming an alkaline dispersion of a vegetable protein material having a proteinaceous solids level of at least 2% by weight, and
    (b) treating said dispersion with a hydroxy alkyl acrylate in an amount sufficient to modify the protein material.
17. The process of claim 16 wherein said vegetable protein material is a vegetable protein isolate.
18. The process of claim 16 wherein said dispersion has a solids level of about 2 to 20% by weight.
19. The process of claim 16 wherein said dispersion has a proteinaceous solids level of 3 to 12% by weight.
20. The process of claim 16 wherein said dispersion has a pH of about 8 to 12.
21. The process of claim 20 wherein said dispersion has a pH of about 9 to 11.
22. The process of claim 20 wherein said dispersion has a pH of about 10.
23. The process of claim 16 wherein said dispersion has a temperature of about 20° to 60° C.
24. The process of claim 16 wherein the amount of hydroxy alkyl acrylate is about 2 to 15 by weight of the proteinaceous solids.
25. The process of claim 20 wherein the amount of hydroxy alkyl acrylate is about 5 to 10 by weight of the proteinaceous solids
26. The process of claim 16 wherein the alkyl group is C$_1$ to C$_8$.
27. The process of claim 16 wherein the vegetable protein material is a soy protein isolate.
28. The process of claim 16 including the step of adjusting the pH of the treated dispersion to the isoelectric point to precipitate the modified protein material.
29. The process of claim 16 including the step of dewatering the modified protein material.
30. The process for the production of modified vegetable protein adhesive binder comprising
    (a) forming an alkaline dispersion of a vegetable protein material having a proteinaceous solids level of about 2 to 20% by weight.
    (b) treating said dispersion with an hydroxy alkyl acrylate in which the alkyl group is selected from the group consisting of ethyl and propyl in an amount sufficient to modify the protein material.
31. The process of claim 30 wherein said vegetable protein material is a vegetable protein isolate.
32. The process of claim 30 wherein said dispersion has a proteinaceous solids level of 3 to 12% by weight.
33. The process of claim 30 wherein said dispersion has a pH of about 8 to 12.
34. The process of claim 33 wherein said dispersion has a pH of about 9 to 11.
35. The process of claim 34 wherein said dispersion has a pH of about 10.
36. The process of claim 30 wherein said dispersion has a temperature of about 20° to 60° C.
37. The process of claim 30 wherein the amount of hydroxyl alkyl acrylate is about 2 to 15% by weight of the proteinaceous solids.

38. The process of claim 36 wherein the amount of hydroxy alkyl acrylate is about 5 to 10% by weight of the proteinaceous solids.

39. The process of claim 30 wherein the vegetable protein material is a soy protein isolate.

40. The process of claim 30 including the step of adjusting the pH of the treated dispersion to the isoelectric point to precipitate the modified protein material.

41. The process of claim 30 including the step of dewatering the modified protein material.

42. The product produced by the process of claim 1.
43. The product produced by the process of claim 16.
44. The product produced by the process of claim 30.

* * * * *